United States Patent [19]

Steinkuhl et al.

[11] Patent Number: 5,033,604
[45] Date of Patent: Jul. 23, 1991

[54] CONNECTIONS BETWEEN THE PANS OF SCRAPER-CHAIN CONVEYORS

[75] Inventors: Bernd Steinkuhl; Heinz-Otto Fiesel; Christoph Rassmann, all of Lünen, Fed. Rep. of Germany

[73] Assignee: Gewerkschaft Eisenhutte Wetfalia GmbH, Fed. Rep. of Germany

[21] Appl. No.: 533,384

[22] Filed: Jun. 5, 1990

[30] Foreign Application Priority Data

Jun. 14, 1989 [DE] Fed. Rep. of Germany ....... 3919433

[51] Int. Cl.$^5$ ............................................. B65G 19/18
[52] U.S. Cl. ................................... 198/735.6; 198/520
[58] Field of Search .................. 198/861.2, 735.1, 520; 299/43, 64

[56] References Cited

U.S. PATENT DOCUMENTS

| 4,134,489 | 1/1979 | Sabes | 198/735.6 |
| 4,607,890 | 8/1986 | Merten et al. | 198/735.6 X |

Primary Examiner—Joseph E. Valenza
Assistant Examiner—Keith L. Dixon
Attorney, Agent, or Firm—Samuels, Gauthier & Stevens

[57] ABSTRACT

The pans of a scraper-chain conveyor have a plough guide at one side. The pans are connected together at said one side with the aid of coupling pieces engaged in pockets in the side walls of the pans. Each coupling piece is pivotably fitted to a plate-like securing element which serves as a handle to enable the coupling piece to be inserted into or removed from the pockets. The securing element can be swung down into further pockets formed in the plough guide to lock the coupling piece in place.

11 Claims, 4 Drawing Sheets

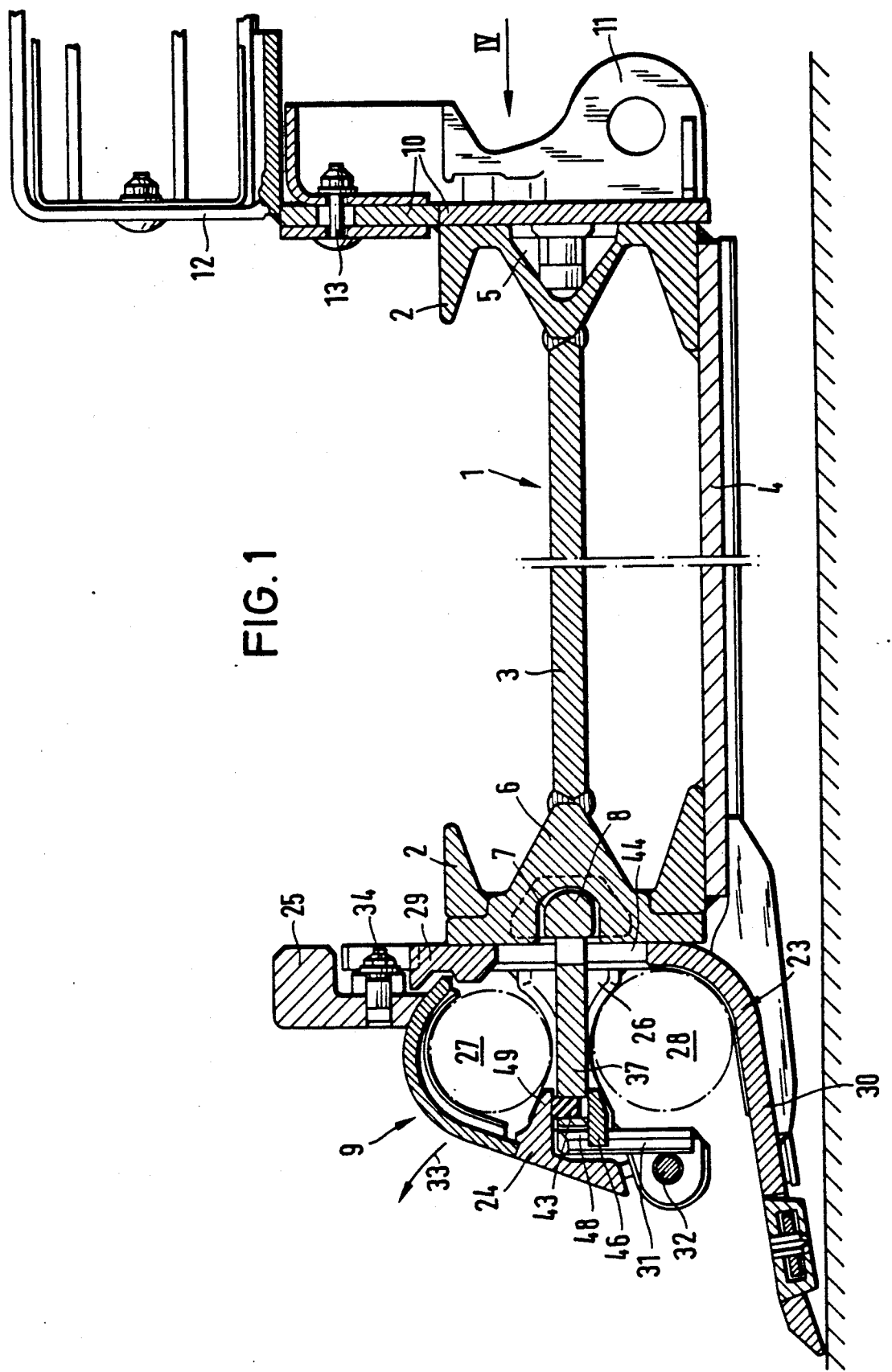

CONNECTIONS BETWEEN THE PANS OF SCRAPER-CHAIN CONVEYORS

BACKGROUND TO THE INVENTION

1. Field of the Invention

The invention relates to a scraper-chain conveyor for use in mineral mining installations and more particularly to connection means and devices used to connect the individual channel sections or pans of the conveyor together.

2. Description of Prior Art

The pans of conveyors are usually connected, as is known, in a tension-resistant manner by means of strong connections such that they can perform slight relative angular movements in the vertical and horizontal planes. As connecting elements there are normally used, in addition to screw bolts and eyelets, in particular threadless toggle bolts resembling dog-bones which are inserted in pockets in the side walls of the conveyor pans and secured therein by means of special securing elements (DE-PS 30 42 537, DE-PS 26 36 527, DE-OS 36 27 207). The pockets for the toggle bolts can be formed by V-shaped grooves in the pan side walls or by coupling parts welded into these grooves which engage one in another in the manner of a mortise and tenon joint between the conveyor pans.

In known installations, plough guides are fitted on the working face side or the goaf side of the conveyor pans. Within the guide there are passages separated by spacers and through which a chain for drawing the plough runs. Covering hoods or covering plates or the like close off the passages for the plough chain. It is known that the conveyor pan connections can be arranged, not directly on the side walls of the conveyor pans, but on the parts of the plough guide connected to the side walls of the conveyor pans. In a known design of this type, eyelets which are placed on the conveyor pans on pegs of the spacers of the plough guide are used as connecting elements (DE-PS 27 51 458). The arrangement is such that the covers which can be swung toward the working face from the closed positions secure the eyelets in pocket recesses of the spacers. If the conveyor pan connections are arranged in the V-shaped grooves of the conveyor pans behind the plough guide on the side wall using the space available, the connecting elements are not accessible without dismantling the plough guide. This applies, in particular, in the case of plough guides mounted on the working face side of the conveyor pans.

SUMMARY OF THE INVENTION

The invention is based on the known toggle-type connections in which pockets for the coupling pieces or toggles are located on the side walls of the conveyor pans or in the grooves of the side walls. An object of the invention is primarily to design a connection of this type such that the coupling piece can be inserted and released without difficulty even when the plough guide is used.

According to the invention, the coupling piece has a securing element which serves as a handle and projects from the coupling piece receiving pockets into further pockets or the like of the plough guide in the coupled state and is held on the plough guide. The coupling piece may have enlarged heads and a shank therebetween as is known.

The securing element is directed transversely to the axis of the coupling piece and simultaneously serves as a handle by means of which the coupling piece can be introduced into the pockets when parts of the plough guide are moved and, if necessary, can also be removed directly from the pockets without the entire plough guide having to be dismantled. When the coupling piece rests properly in the pockets the securing element projects laterally from the pockets into the plough guide. The further pockets forming a receiving space for the securing element are located outside the path of travel of the plough chain. The arrangement is such that the coupling piece is simultaneously held in its locked position by the securing element located in the receiving pocket or the like, i.e. it cannot come out of the pockets during operation.

The guide means for the plough preferably includes spacers separating the passages for the chain vertically and covers for closing off the passages at least partly. The further pockets may be provided in the spacers.

For insertion of the coupling piece into the pockets, it is merely necessary to remove, i.e. to take out or fold down the covers from the fitted position. A detachable or pivotal mounting for the covers is desired as the plough chain must remain accessible from the exterior during operation. On the other hand, other parts of the plough guide which produce the connection to the conveyor pans can remain in their fitted position. It is thus possible to connect these parts of the plough guide undetachably to the conveyor pans by welding if necessary. The conventional screwed connections for these parts can therefore be dispensed with. The receiving pockets for the securing elements of the coupling pieces can then be formed by the ends of the spacers. This can be implemented in that the spacers are provided with recesses for receiving the securing elements or simply in that the spacers end at some distance from the ends of the side walls of the conveyor pans. Preferably the end regions of the securing element have a stepped profile and the further pockets are shaped in a similar manner.

In a preferred design, the securing element is mounted on the coupling piece with pivot joints. The articulated connection between the coupling piece and the securing element simplifies the introduction of the coupling piece obliquely from above into the reception pockets and consequently also the removal of the coupling piece. Furthermore, such an arrangement allows the securing element to be folded into the locking position in which it secures the coupling piece in its fitted position, after the coupling piece has been inserted into the pockets.

The above-mentioned securing element is preferably a plate which is appropriately articulated via pivot joints to the two ends of the coupling piece. The securing element or plate can then be provided with an opening forming a grip to simplify handling. Furthermore, it is advantageous for the securing element to be secured itself in its receiving pockets by the covers located in their fitted position.

Overall, the invention provides a simple and reliable connection in which the coupling piece can be introduced, after the covers have been removed or folded down, from the exterior into the pockets arranged behind the chain passages of the plough guide on the side walls of the conveyor pans and can be reliably held in the fitted position without complicated manipulation. The conveyor pan connection according to the invention affords particular advantages when the plough guide is mounted on the working face side of the conveyor pans of the chain conveyor. However, it can also be provided in crosswise systems with a plough guide mounted on the goaf side of the conveyor pans.

As mentioned, the receiving pockets for the securing elements are best located at the ends of the conveyor pans or between the spacers. Supports supporting the securing elements are preferably arranged e.g. on the spacers. The covers can have, on their interior, locking cams or the like which hold the supporting elements in the locking position on the supports. To avoid clattering noises, resilient buffers, for example rubber buffers or the like, are appropriately arranged on the securing elements.

With a plough guide arranged on the working face side of the chain conveyor, L-shaped angle plates with their upstanding portions can be attached to the side walls of the conveyor pans as a bottom guide for the plough. The upstanding portions of these angle plates preferably have recesses through which the coupling piece can be introduced into their pockets. The securing elements connected to the coupling pieces then pass through the recesses of the angle plates. The angle plates and also the spacers can be rigidly connected to the conveyor pans by welding as they do not have to be released from the conveyor pans for inserting and releasing the coupling pieces.

The invention may be understood more readily and various other aspects and features of the invention may become apparent from consideration of the following description.

BRIEF DESCRIPTION OF DRAWINGS

An embodiment of the invention will now be described, by way of example only, with reference to the accompanying drawings, wherein FIG. 1 is a sectional end view of a conveyor with connection means constructed in accordance with the invention;

DESCRIPTION OF PREFERRED EMBODIMENT

Figure 3:
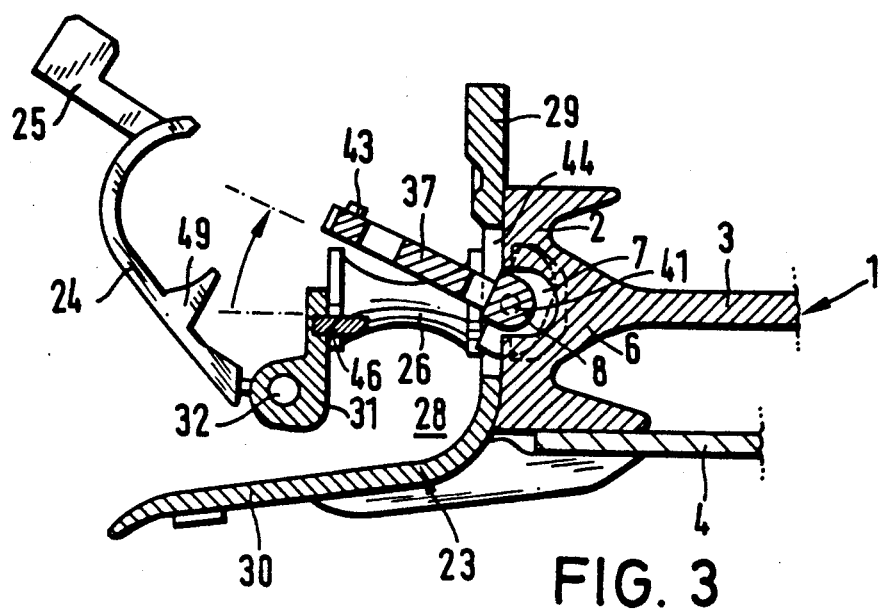
FIG. 3 is a schematic part-sectional end view of part of the conveyor depicting the assembly of the connection means.

The drawings represent a scraper chain conveyor which, as is known, is composed of a series of channel sections or pans 1 joined end-to-end. Each conveyor pan 1 is constructed from two generally sigma-shaped side walls 2 with central flanges connected together by means of a floor plate 3 welded thereto. A base plate 4 is welded between the lower flanges of the side walls 2. The walls 2 and the plates 3, 4 all combine to define guide channels for guiding a scraper-chain assembly (not shown) for movement along the pans 1. A guide 9 for a mineral winning machine, in the form of a plough, is disposed on the working face side of the conveyor. The construction of the guide is known, for example, from DE-OS 27 51 458. The exteriors of the side walls have V-shaped grooves 5. On the ends of each pan 1 at the working face side there are provided reinforced connection parts 6. The connection parts 6 are complementary to engage one within another as a mortise and tenon type joint. The connection parts 6 are also shaped to present recesses open to the exterior. These recesses form pockets 7 which receive a coupling piece 8 used to connect the pans 1 together. The connection parts 6 are welded into apertures in the end regions of the side walls 2. The coupling pieces 8 and the connection joints hold the pans 1 together at the mineral face side in a tractionally resistant manner, whilst allowing some flexibility of movement in horizontal and vertical senses and such connection joints are known per se. The construction of the coupling pieces 8 is described in more detail hereinafter.

Figure 4:
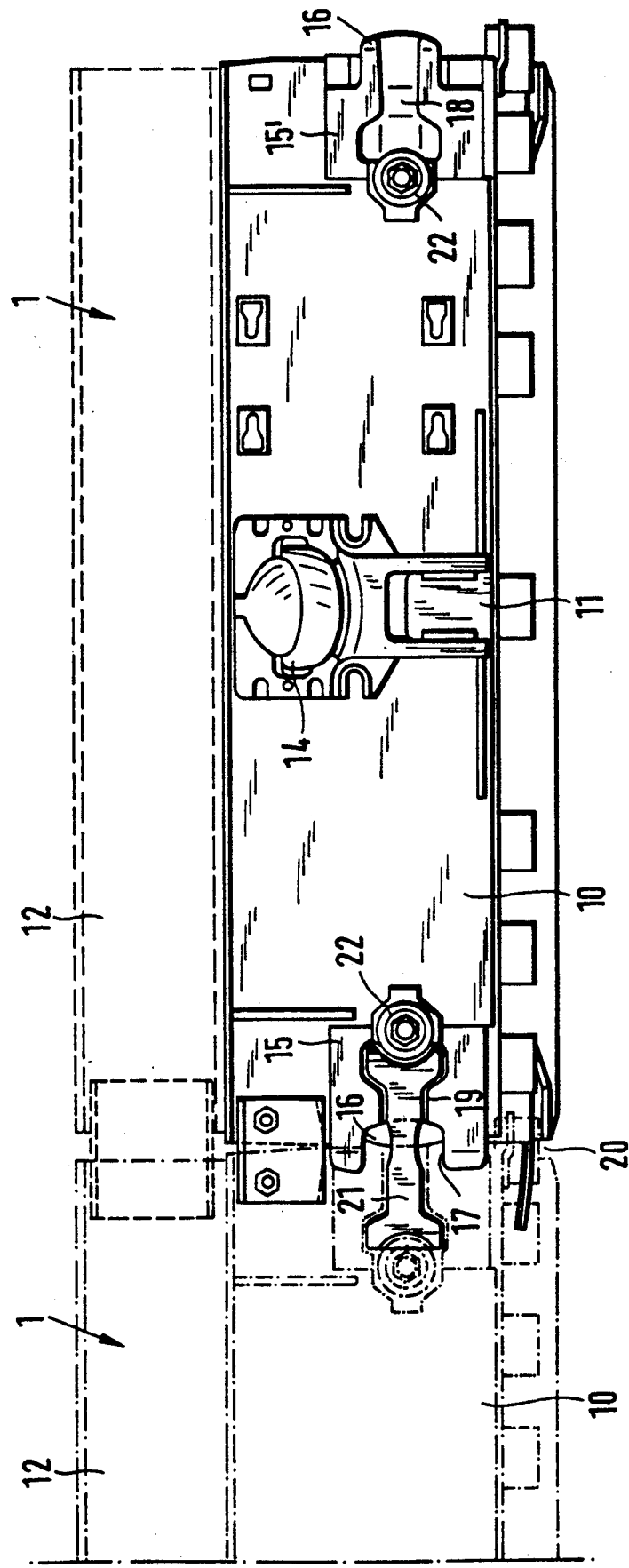
FIG. 4 is a side view of part of two adjacent pans of the conveyor, the view being taken in the direction of arrow IV of FIG. 1.

At the goaf side of the conveyor, the side walls 2 of the pans 1 have upstanding plates 10 on which accessories are mounted. As shown in FIGS. 1 and 4, the plates 10 mount brackets 11 with articulated joints 14 for hydraulic control devices used to adjust the cutting level of the plough. The brackets 11 also serve to mount advancing mechanisms used to shift the conveyor and the plough towards the working face. The plates 10 can be welded to the goaf side walls 2 of the conveyor pans 1. Screw-connections 13 serve to join the plates 10 to additional components 12. On the ends of each pan 1 at the goaf side there are welded connection parts 15, 15' which are also complementary and engage one within another in the manner of a mortise and tenon joint as indicated by reference numerals 16, 17 in FIG. 4. The connection parts 15, 15' also have recesses 18, 19 open from the exterior to form pockets which receive a coupling piece 21. The coupling pieces 21 and the connection parts 15, 15' likewise connect the adjacent ends of the pans 1 together at the goaf side in a tractionally resistant manner whilst permitting flexibility in vertical and horizontal senses. The coupling pieces 21 are retained in position with detachable securing elements 22.

The plough guide 9 is composed of L-shaped angle plates 23 fixed to the mineral face side walls 2 of the pans 1 as by welding and ramp-like hinged cover plates 24. Spacers 26 welded onto the upstanding portions 29 of the plate 23 separate upper and lower passages 27, 28 along which a chain (not shown) used to propel the plough circulates. The lower run of the chain in the lower passage 28 is drivably coupled to the plough (not shown). The plough is supported on lower inclined portions 30 of the plates 23 and is guided by these portions 30 and by the cover plates 24 which close off the passage 27 and partly close off the passage 28. Webs 31 depend from the spacers 26 and provide pivot joints 32 for the covers 24. The covers 24 are detachably secured to the upstanding portions 29 of the plates 23 with screw connections 34 and when released the covers 24 can be swung outwardly in the direction of arrow 33 in FIG. 1 to allow access to the plough drive chain.

Figure 5:
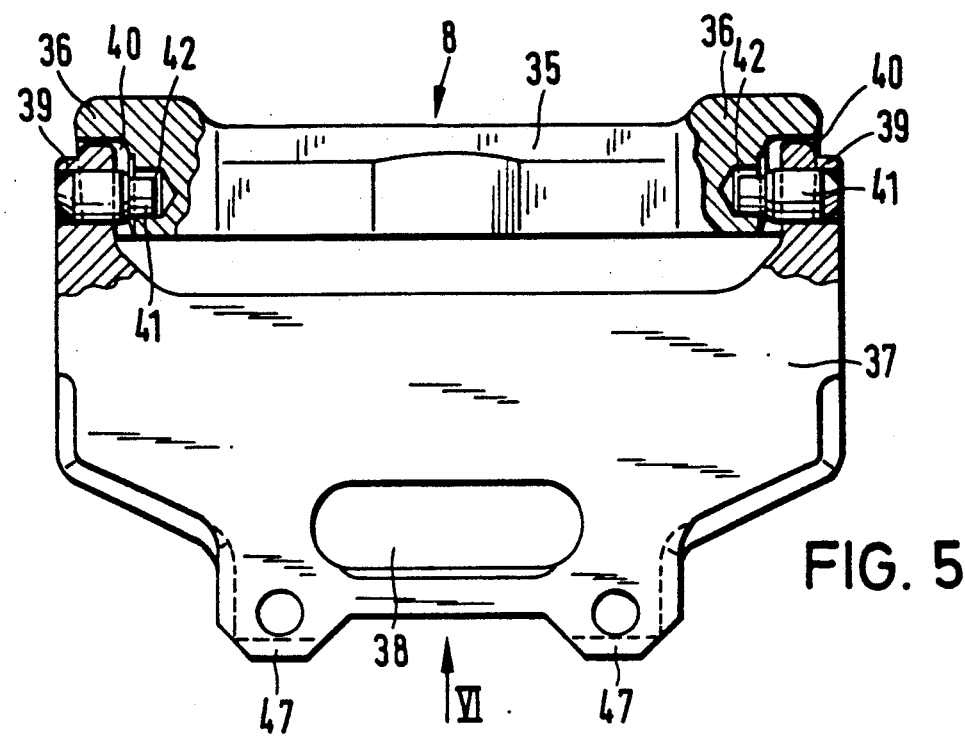
FIG. 5 is a part-sectional plan view of one of the connection assemblies.
Figure 6:
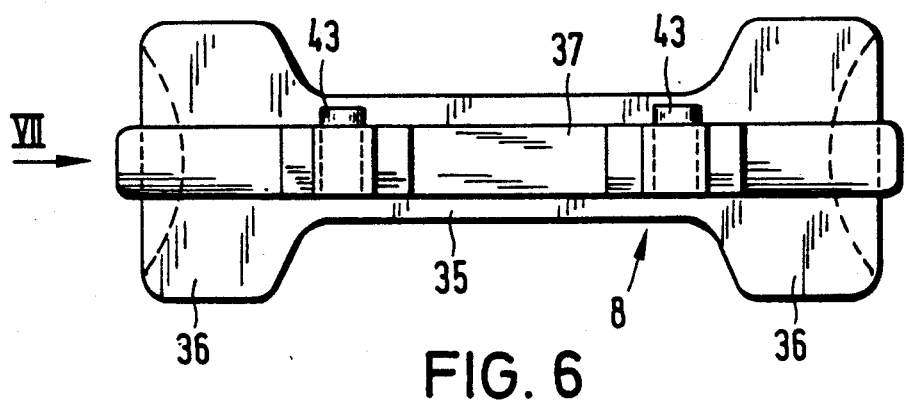
FIG. 6 is a side view of the connection assembly, the view being taken in the direction of arrow VI of FIG. 5.
Figure 7:
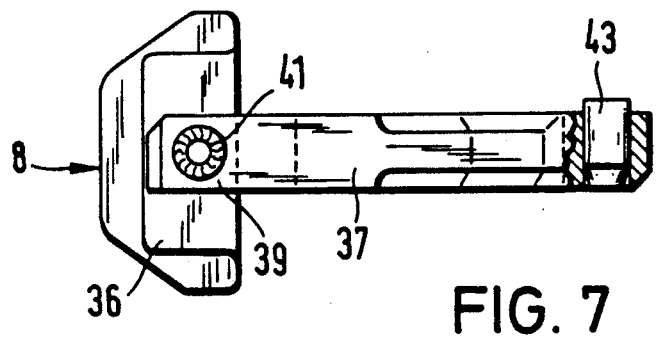
FIG. 7 is an end view of the connection assembly, the view being taken in the direction of arrow VII of FIG. 6.

FIGS. 5 to 7 depict a preferred form for the assembly or connection composed of the coupling piece 8 and its securing element used at the mineral face side of the pans 1. As shown, the coupling piece 8 is shaped integrally with recessed heads 36 and a central shank 35. The associated securing element 37 is a plate with a slot 38 designed for gripping in the hand. The element 37 has arms 39 which fit into the recesses in the heads 36. The arms 39 carry pegs 41 which engage in openings 42 in outwardly facing walls of the heads 36 to form pivot joints which enable the element 37 to pivot about an axis extending through the axes of the pegs 41. The element 37 has openings at the outer region in which rubber buffers 43 extending beyond the upper face of the element 37 are fitted.

Figure 2:
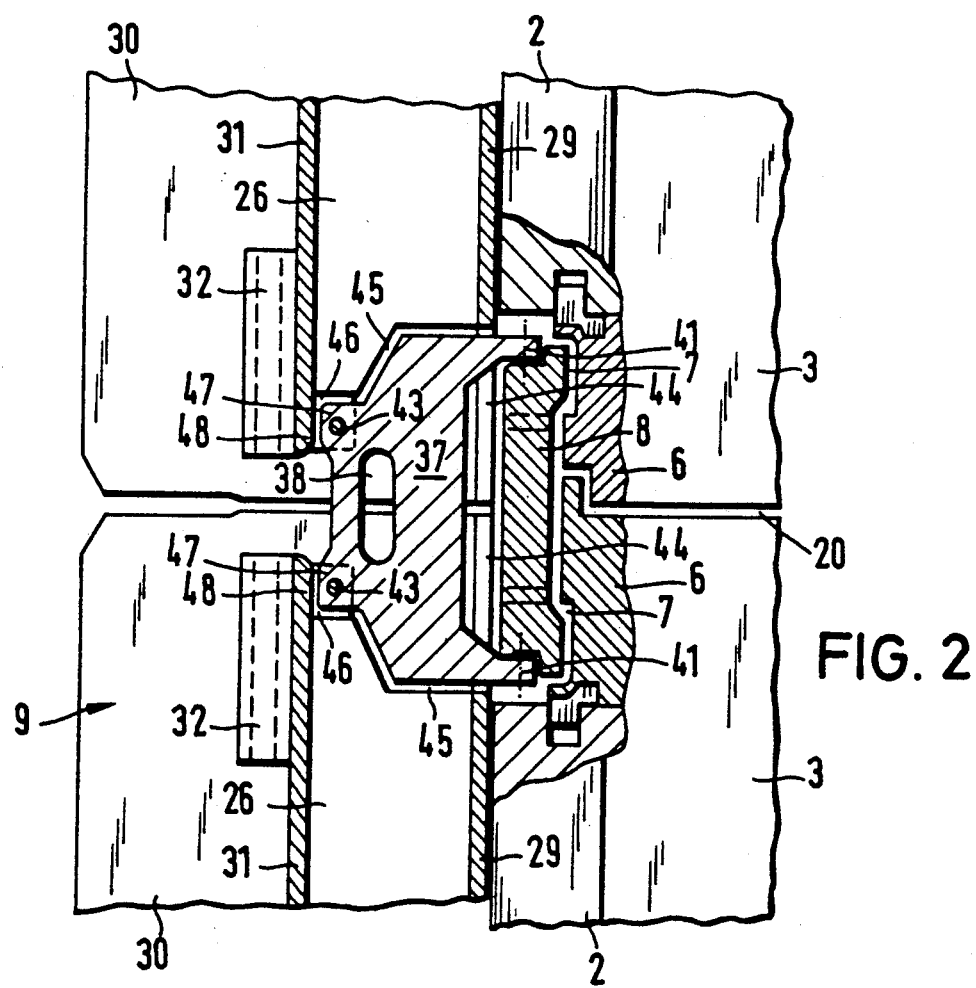
FIG. 2 is a part-sectional plan view of the connection means between adjacent pans of the conveyor with the covers of the guide removed.

As shown, in particular, in FIGS. 2 and 3, the portions 29 of the adjacent plates 23 have terminal recesses 44 which are located in front of the pockets 7 for one of the coupling pieces 8. The spacers 26 are also provided with recesses which define shaped pockets 45 for accommodating the securing element 37 as well as supports 46. When the covers 24 are swung out toward the working face, the coupling piece 8 can therefore be introduced obliquely from above through the recesses 44 into the pockets 7, as shown in FIG. 3 with the securing element 37 pivotally connected to the coupling piece 8 serving as a handle or implement. The element 37 can be pivoted down into the locking position in which it is located approximately in a horizontal plane defined by the spacers 26 in the receiving pockets 45. The element 37 is then engaged on the supports 46. In the fitted or locked position, the element 37 lies with its external edges 47 against corresponding stop faces 48 of the spacers 26, guaranteeing the position of the element 37 and the coupling piece 8 connected thereto. To prevent the elements 37 from pivoting up from the locked position, the covers 24 have, on their interior, rigid locking cams 49 which, when the covers 24 are swung into the closure position according to FIG. 1, are placed from above against the elements 37 or the rubber buffers 43 thereof. The coupling pieces 8 with the elements 37 can consequently be fitted and removed from the exterior. It goes without saying that the coupling pieces 8 can be inserted into the pockets 7 by means of the elements 37 even if the covers 24 are removable laterally from the parts of the plough guide instead of the hinged covers. The covers 24 are not shown in FIG. 2 for reasons of clarity.

We claim:

1. In a scraper-chain conveyor comprising: a plurality of pans joined end-to-end, each pan having a pair of side walls and a floor plate connected therebetween and means at one side of the pans for guiding a mineral winning machine for movement along the pans and for defining internal passages through which a chain used to drive the machine is moved; connection means for connecting together two adjacent said pans, said connection means at least including a coupling piece, laterally-open pockets provided in end regions of adjacent side walls at said one side of the adjacent pans for receiving the coupling piece, a securing element for retaining the coupling piece within the pockets and further pockets in the guide means for receiving the securing element to lock the coupling piece in said pockets, wherein the securing element is fitted to the coupling piece and serves also as a handle for aiding the fitting and removal of the coupling piece.

2. Connection means according to claim 1, wherein the guide means includes spacers which separate the passages vertically and the further pockets are provided in the spacers.

3. Connection means according to claim 1, wherein pivot joints are provided between the securing element and the coupling piece.

4. Connection means according to claim 3, wherein the securing element is a plate provided with an opening opposite the pivot joints.

5. Connection means according to claim 1, wherein the guide means includes covers which at least partly close off the passages and permit access to the passages and the covers associated with said adjacent pans have means for locking the securing element in the further pockets.

6. Connection means according to claim 5, wherein the further pockets have supports against which the securing element is held by the locking means on the covers.

7. Connection means according to claim 6, wherein the securing element has resilient buffers which engage on the locking means.

8. Connection means according to claim 1, wherein the guide includes L-shaped plates fixed to the one side of the pans, each L-shaped plate having an upstanding portion disposed alongside said one side of the associated pan and wherein recesses are provided into adjacent end regions of the upstanding portions of the L-shaped to permit the coupling piece to be located in the pockets.

9. Connection means according to claim 1, wherein the securing element has step-shaped end regions and the further pockets are shaped in corresponding manner.

10. Connection means according to claim 8, wherein the L-shaped plates are welded to the one sides of the pans.

11. Connection means according to claim 5, wherein the covers are mounted for pivoting.

* * * * *